US009939011B2

(12) United States Patent
Tessier et al.

(10) Patent No.: US 9,939,011 B2
(45) Date of Patent: Apr. 10, 2018

(54) SELF-ALIGNING SHAFT ASSEMBLY

(71) Applicant: ADVANTAGE PRODUCTS INC., Didsbury (CA)

(72) Inventors: Lynn Tessier, Eckville (CA); Nicholas Joseph Schock, Calgary (CA)

(73) Assignee: Advantage Products Inc., Didsbury (CA)

( * ) Notice: Subject to any disclaimer, the term of this patent is extended or adjusted under 35 U.S.C. 154(b) by 184 days.

(21) Appl. No.: 14/705,709

(22) Filed: May 6, 2015

(65) Prior Publication Data

US 2015/0323004 A1 Nov. 12, 2015

Related U.S. Application Data

(60) Provisional application No. 61/989,620, filed on May 7, 2014.

(51) Int. Cl.
*F16C 23/04* (2006.01)
*H02K 5/16* (2006.01)
(Continued)

(52) U.S. Cl.
CPC .............. *F16C 23/04* (2013.01); *F01D 15/10* (2013.01); *F03B 7/00* (2013.01); *F03B 11/06* (2013.01); *F03B 17/062* (2013.01); *F16C 3/02* (2013.01); *F16C 35/02* (2013.01); *H02K 5/16* (2013.01); *H02K 5/163* (2013.01); *H02K 7/00* (2013.01);
(Continued)

(58) Field of Classification Search
CPC .... F16C 1/06; F16C 1/108; F16C 1/28; F16C 1/02; F16C 23/04; F03B 11/066; F03B 11/062; F03B 17/062; F03B 13/10; F05D 2240/62
See application file for complete search history.

(56) References Cited

U.S. PATENT DOCUMENTS 2,549,561 A * 4/1951 Baker ................. F16C 7/02
74/42
3,083,680 A 4/1963 Willis, Jr. et al.
(Continued)

FOREIGN PATENT DOCUMENTS

| CA | 2697279 | 9/2010 | |
| JP | 60022077 A * | 2/1985 | ............ F03B 11/066 |

OTHER PUBLICATIONS

English translation of JP 60022077.*
(Continued)

*Primary Examiner* — Ninh H Nguyen
*Assistant Examiner* — Topaz L Elliott
(74) *Attorney, Agent, or Firm* — Parlee McClaws LLP (CGY); Sean Goodwin

(57) ABSTRACT

A working end of a rotary shaft extends through a bearing supported at a distal end of a cantilever housing, the shaft's working end being subjected to transverse loading. The bending stiffness of the system is matched so that the angular deflection of the shaft and supporting cantilever housing are coordinated to minimize angular misalignment at the bearing. A cantilever system provides for apparatus and methodology demonstrating arrangements characterized by an operational ease for submersion of the working end in a fluid and ease of access to the bearing. Mitigation of misalignment enables the use of radial bearings.

14 Claims, 12 Drawing Sheets

(51) Int. Cl.
*F16C 3/02* (2006.01)
*F03B 7/00* (2006.01)
*H02K 7/18* (2006.01)
*H02K 7/00* (2006.01)
*F16C 35/02* (2006.01)
*F03B 17/06* (2006.01)
*F03B 11/06* (2006.01)
*F01D 15/10* (2006.01)
*F16C 33/26* (2006.01)

(52) U.S. Cl.
CPC ............... *H02K 7/003* (2013.01); *H02K 7/18* (2013.01); *H02K 7/1823* (2013.01); *F16C 33/26* (2013.01); *F16C 2206/04* (2013.01); *F16C 2360/00* (2013.01); *Y02E 10/20* (2013.01)

(56) References Cited

U.S. PATENT DOCUMENTS

| 3,574,492 | A | * | 4/1971 | Schwary | ................. | F01C 1/086 384/202 |
| 4,487,122 | A | * | 12/1984 | George | ................. | B41F 13/187 100/162 B |
| 4,832,571 | A | * | 5/1989 | Carrol | ................. | F03D 3/064 416/11 |
| 6,402,383 | B1 | | 6/2002 | Parsoneault et al. | | |
| 8,664,792 | B2 | * | 3/2014 | Rebsdorf | ............. | B29C 53/585 290/55 |
| 8,692,402 | B1 | * | 4/2014 | Wessner | ................ | F03B 13/183 290/53 |
| 2004/0079316 | A1 | | 4/2004 | Lawrence | | |
| 2010/0237621 | A1 | * | 9/2010 | Tessier | .................... | F16C 17/03 290/52 |
| 2011/0309632 | A1 | * | 12/2011 | Rebsdorf | ............. | B29C 53/585 290/55 |
| 2014/0217732 | A1 | * | 8/2014 | Levin | .................. | H02K 7/1823 290/52 |
| 2014/0265337 | A1 | * | 9/2014 | Harding | ................... | F03B 7/00 290/52 |

OTHER PUBLICATIONS

Cooley, Craig. "The Development of Open Water-Lubricated Polycrystalline Diamond (PCD) Thrust Bearings for Use in Marine Hydrokinetic (MHK) Energy Machines" US Synthetic Bearings, Nov. 31, 2012.*

International Search Report issued in respect of PCT/CA2015/050398.

* cited by examiner

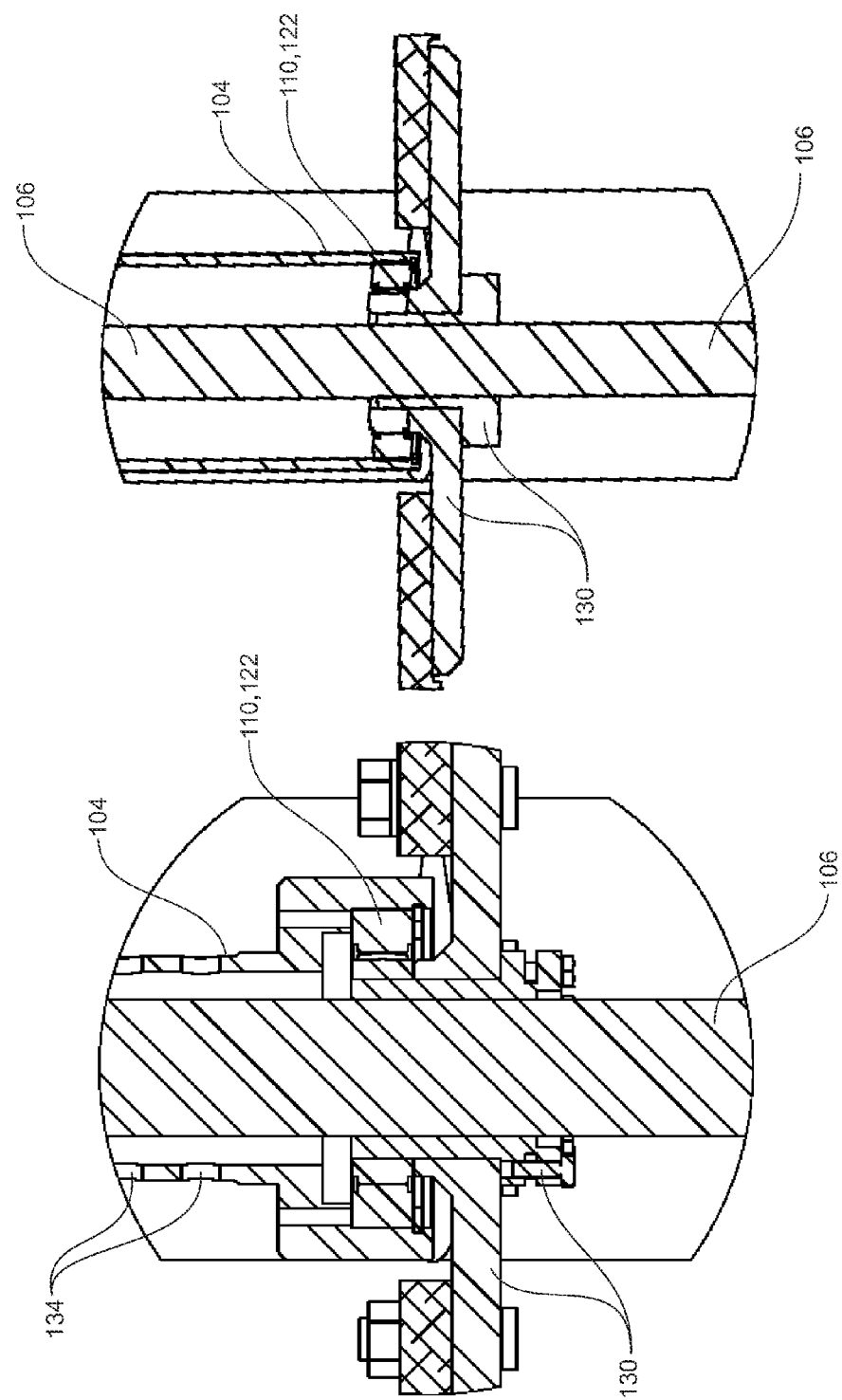

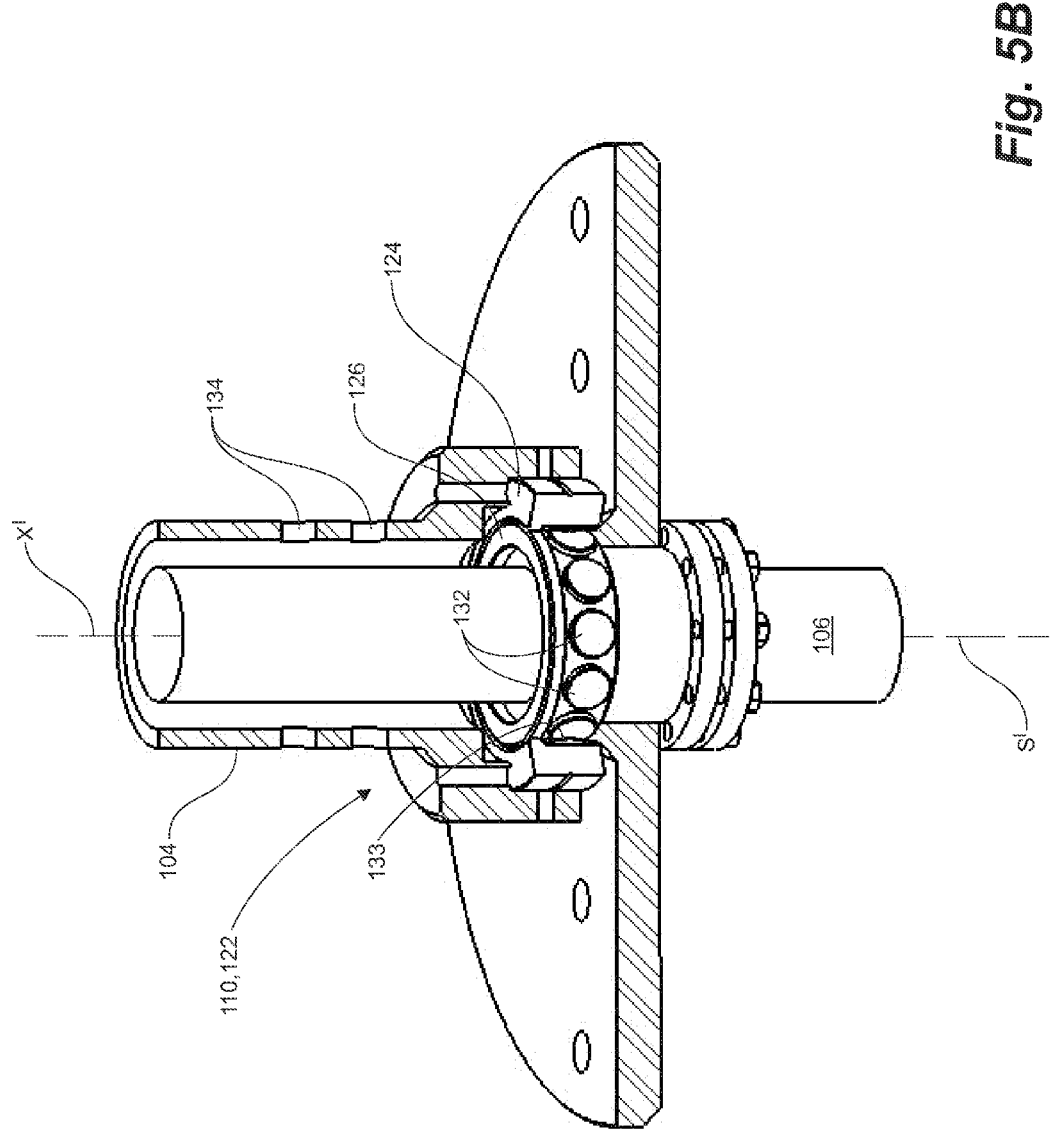

SELF-ALIGNING SHAFT ASSEMBLY

FIELD

Embodiments described herein relate to a self-aligning support structure for a shaft in a rotary system such as in a hydroelectric turbine system and a method for reducing misalignment between stationary and rotary components of the rotary system.

BACKGROUND

A rotary system typically comprises a rotating element such as a shaft connected to a rotatable device at a force-engagement or working portion thereof and to a driving mechanism at a drive end thereof. The rotary system further comprises one or more bearing assemblies for radially and axially supporting the shaft along its length and typically straddling the working portion. During operation, the shaft is subjected to lateral forces at its working portion about which the rotatable device is connected. This causes some angular deflection of the shaft from its normal rotating axis. In instances where the shaft is supported between at least two closely spaced support bearings, such as a simply supported beam or where one end is constrained and the other simply supported, the angular deflection of the shaft from its normal rotating axis is contained and is small. Support bearings, typically capable of merely radial loads, are not adversely affected by the angular misalignment.

However, the deflection is more pronounced in instances where it is not convenient or economical to provide a second support bearing (a cantilever arrangement) or where it is not possible to closely space the support bearings. In both instances, significant misalignment between the shaft's rotating axis and the axis of the bearing housing can occur. Conventional support bearings cannot accommodate such significant misalignment and this results in failure, accelerated wear and tear of the support bearing or expensive requirement to install spherical bearings.

One example of a challenging environment for shaft support is in the case of a hydroelectric turbine system 10. As illustrated in FIGS. 1A, and 1B, a prior art hydroelectric turbine system 10 is placed within a suitable flow of power fluid, such as water W flowing in a river, penstock, sluice gate or the like. A shaft 14, mounted for rotation about an axis of rotation S, rotatably connects a turbine 16, supported at a working portion 18 thereof and submerged in the flow of water W, with an energy device such as a generator 20 connected at a proximal or non-working end 22 thereof and positioned above the surface of the water. The shaft 14 is radially and axially supported by a radial bearing 24 generally located about an outboard end of the shaft's working portion 18. The radial bearing 24 just happens to also be submerged in the power fluid or water W. The shaft 14 is typically constrained between a pair of bearings at the generator 20.

As shown in schematic format in FIG. 1C, during operation, the fluid imposes a lateral force F on the shaft's working portion 18, causing angular deflection of the shaft 14 and, therefore, misalignment between a rotating axis S of the shaft 14 and an axis X of the structure supporting the bearing 24. The shaft 14 is represented as a beam arrangement, being constrained at the generator 20, typically fit with a spaced pair of bearings, and simply supported at the radial bearing 24.

As shown in FIG. 1D, deflection of the shaft 14 can be even more pronounced when the shaft is cantilevered from the non-working end 22, such as being supported by the generator 20. If the working portion 18 is to be spaced any practical distance from the generator 20, the supporting bearings have to be robust and control significant misalignment-related behavior.

In order to overcome the misalignment problem, it has been known to use self-aligning bearing assemblies, such as spherical bearing 24 depicted in FIG. 1C, to support the rotating shaft 14 at its working end where the axis of the shaft is misaligned from the axis of the bearing. One such bearing assembly is disclosed in U.S. Pat. No. 8,613,554 to Tessier et al. (US'544 patent) in the context of a hydroelectric turbine system. The self-aligning bearing assembly described in the US'544 patent comprises an inner bearing, an inner bearing support, an outer bearing and an outer bearing support housed in a stationary bearing housing. A spherical joint is located between the outer bearing support and the stationary bearing housing. As represented in FIG. 1C, the spherical joint permits the shaft-bearing inner component of the bearing assembly 24 to tilt or move angularly along with the shaft 14 under load conditions for maintaining bearing support despite angular rotation of the inner bearing and outer bearing.

The bearing assembly of the US'554 patent is, however, complex in nature, includes a large number of components and is, therefore, expensive and difficult to install and maintain.

There is a need in the industry for improved arrangements for overcoming the misalignment problems discussed in the foregoing paragraphs.

SUMMARY

Embodiments described herein relate to a rotary system wherein misalignment between a rotating shaft and a radial bearing is countered by an elongate structure supporting the shaft. Under load conditions when the shaft angularly deflects, the support structure causes the radial bearing to also tilt or move angularly with the shaft thereby enabling the radial bearing to maintain a parallel relationship with the shaft at all times. This avoids the need for expensive self-aligning radial bearings of the prior art.

Accordingly, in one broad aspect a self-aligning shaft assembly is provided for rotatably supporting a fluid energy extracting device at a working end thereof. An elongate housing is cantilevered from and extending from a base to an unsupported distal end, the elongate housing having a nominal longitudinal axis of rotation at rest and a first bending stiffness resistant to a transverse load applied to the distal end. A rotating shaft extends generally through the elongate housing and out through the distal end, the shaft being rotatable about the nominal longitudinal axis of rotation, and a distal bearing is disposed between the shaft and the distal end of the elongate housing for rotatably and simply supporting the shaft, the shaft cantilevered from the distal bearing to an unsupported working end, the rotating shaft having a second bending stiffness resistant to a transverse load applied to the shaft's working end. The first bending stiffness of the elongate housing and the second bending stiffness of the shaft are such that an angular deflection of the shaft and of the elongate housing from the nominal longitudinal axis of rotation under the transverse load are the same, maintaining alignment between the shaft and the elongate housing at the distal bearing.

As a result of the above cooperative system, the distal bearing can be a radial bearing, the shaft being received within a rotating member of the radial bearing and a non-rotating member of the radial bearing is affixed at about the distal end of the elongate housing. Upon transverse loading applied to the shaft's working end for transfer through the distal bearing to the distal end of the elongate housing, the shaft deflects angularly and the elongate housing defects angularly the same amount.

The above assembly is useful for application in the context where the fluid energy extracting device is a turbine. Further, the system can comprise a driven machine, such as a generator; and a proximal bearing at or about the driven machine, wherein the shaft is supported between the proximal and distal bearings. The turbine can be a liquid turbine wherein the distal end of the elongated housing and distal bearing are submersible in the liquid. The elongated housing can have ports formed therethrough for ingress of liquid to the distal bearing. One form of suitable for working liquid lubrication bearing is a polycrystalline diamond compact (PDC) bearing.

In another aspect of the invention, a method is provide for minimizing misalignment between a shaft and a cantilevered bearing housing, the method comprising: extending a housing from a base in a cantilevered arrangement to an unsupported distal end thereof, the housing having a first bending stiffness; supporting a distal bearing at the housing's distal end; extending a shaft through the elongate housing and out through the distal bearing for rotatable support thereof, the shaft having a working end and a second bending stiffness; and applying a transverse load to the shaft's working end for inducing an angular deflection of the shaft according to the second bending stiffness, the housing similarly deflecting angularly according to the first bending stiffness, wherein the distal bearing remains aligned. A fluid-rotatable device is operatively coupled at the working end of the shaft.

BRIEF DESCRIPTION OF THE DRAWINGS

FIGS. 4A and 4B are enlarged views of an area around the radial bearing of FIG. 3, FIG. 4A illustrating a first arrangement for retaining the radial bearing to the elongate housing, and FIG. 4B illustrating a second arrangement for retaining the radial bearing to the elongate housing;

FIG. 5B is a partial perspective view of another embodiment of the radial bearing of FIG. 3, an outer race secured in the elongate housing and an inner race secured to the rotating shaft, one or more outer race segments having been removed for viewing the inner race, each of the inner race and the outer race comprising a single row of PDC buttons;

FIG. 6A illustrating an instance when a bending stiffness of the elongate housing is not coordinated with a bending stiffness of the rotating shaft, and FIG. 6B illustrating an instance when the bending stiffness of the elongate housing is coordinated with that of the rotating shaft (the angular deflection being exaggerated in both instances)

DETAILED DESCRIPTION

Herein, embodiments of a self-aligning shaft assembly are described in the context of a fluid-engaging, hydroelectric turbine system 100. A housing and bearing laterally supporting the shaft are immersed in a fluid environment that imposes transverse or lateral loading on the shaft. However, it is to be understood that the self-aligning shaft assembly described herein is not limited to hydroelectric turbines, and could be used with any type of a rotary shaft support system under transverse loading.

Figure 1A:
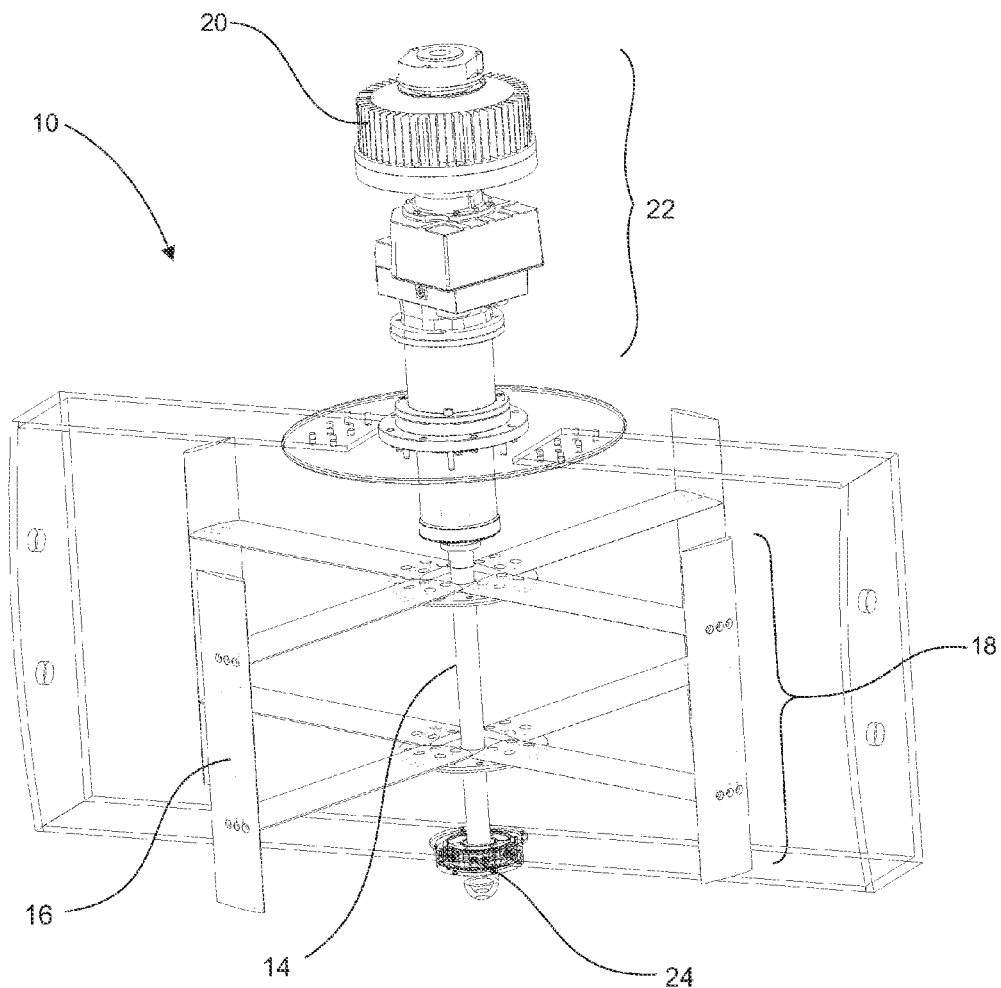
FIG. 1A is a perspective view of a hydroelectric turbine system comprising a radial bearing and a simply supported rotating shaft according to the prior art.
Figure 1B:
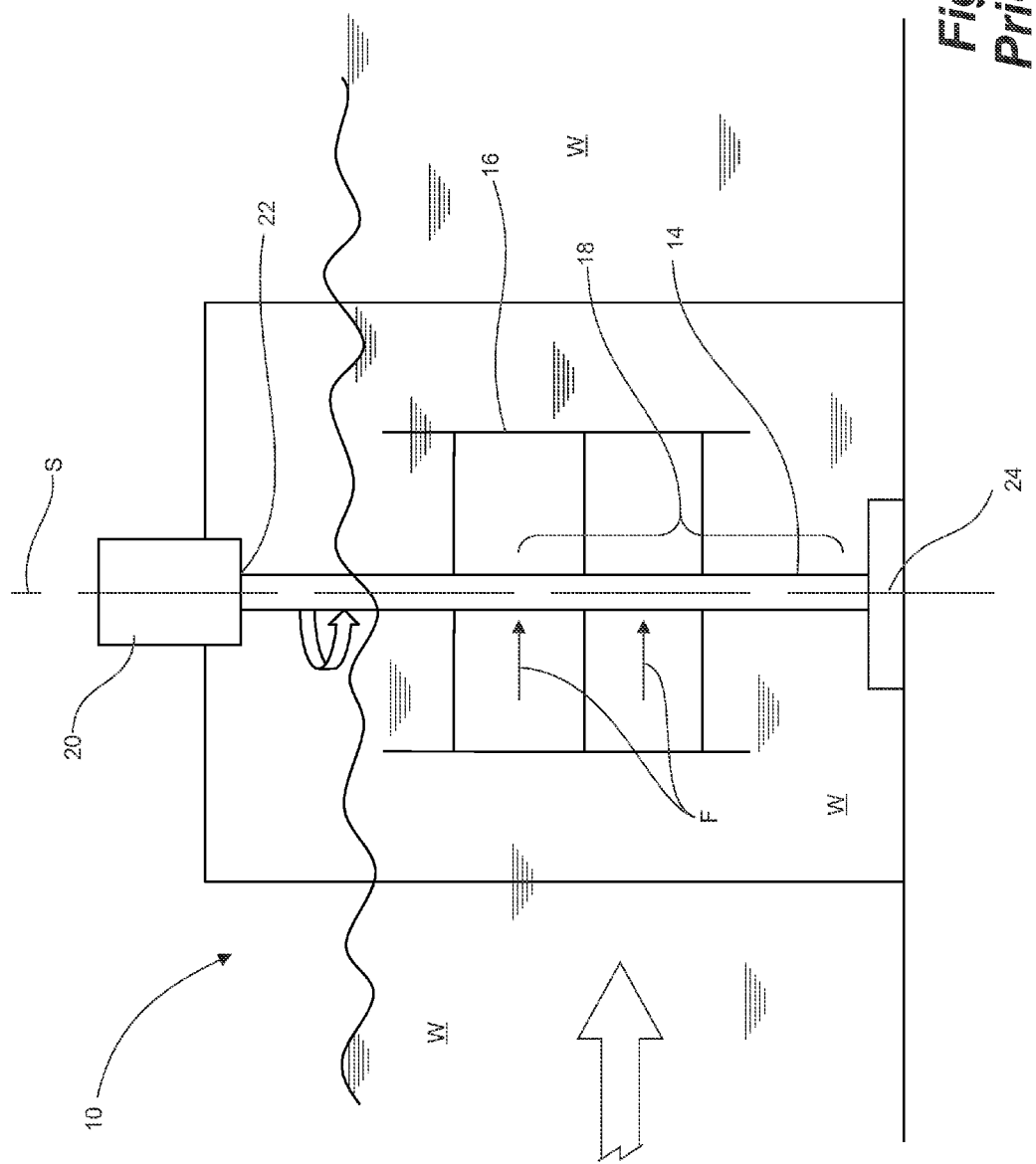
FIG. 1B is schematic front view of the hydroelectric turbine system of FIG. 1A.
Figures 1C, 1D:
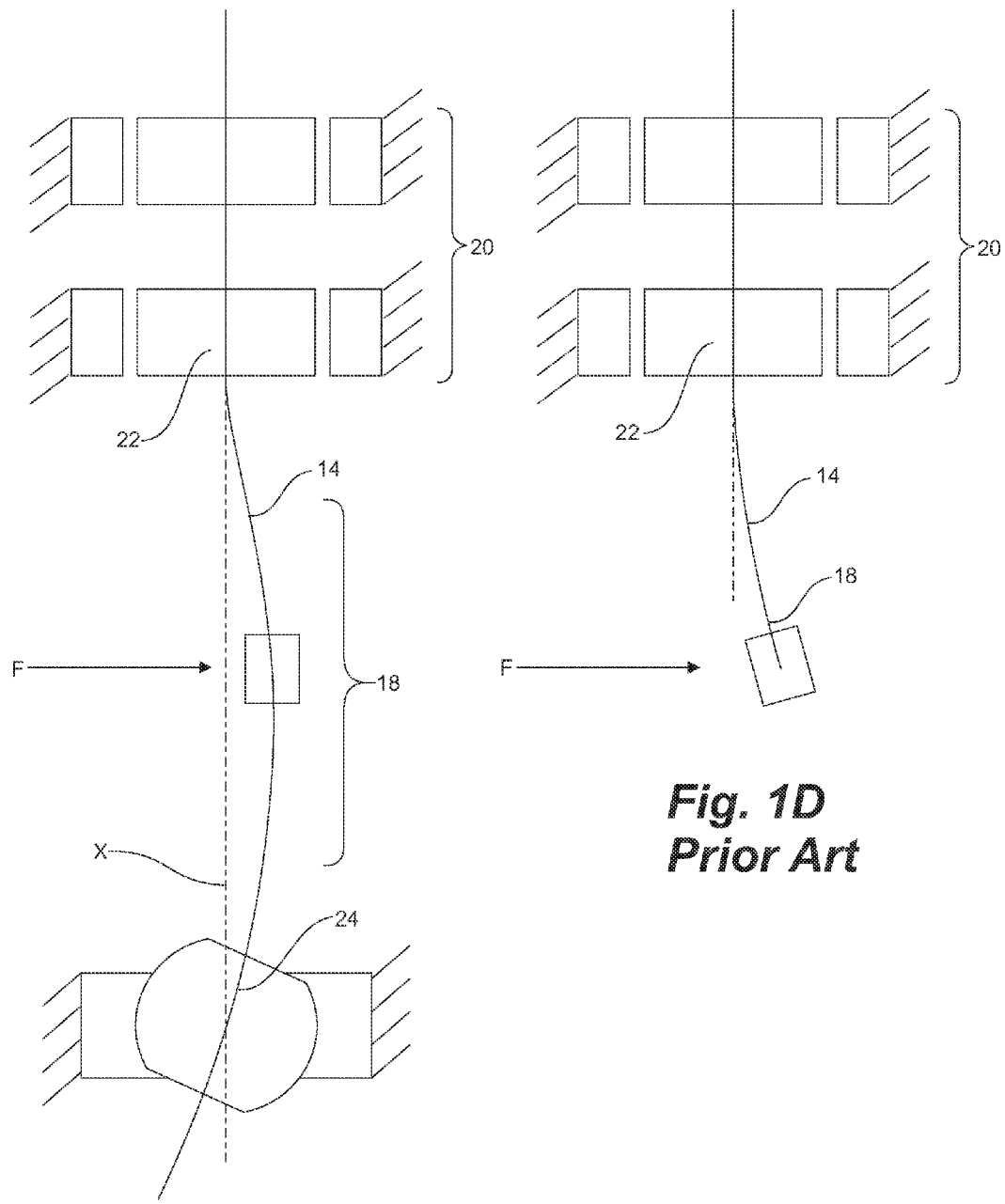
FIGS. 1C and 1D are free body diagrams illustrating deflection of a rotating shaft when subjected to a lateral force F, the deflection of the shaft's axis from its normal rotating axis being illustrated in an exaggerated fashion, FIG. 1C illustrating an instance where the rotating shaft is supported at two points along its length, at its proximal end and at its working end by a radial bearing, misalignment being shown between the shaft's axis of rotation S and the axis X of the bearing housing, and FIG. 1D illustrating an instance where the rotating shaft is cantilevered and is supported only at its proximal end.
Figure 2A:
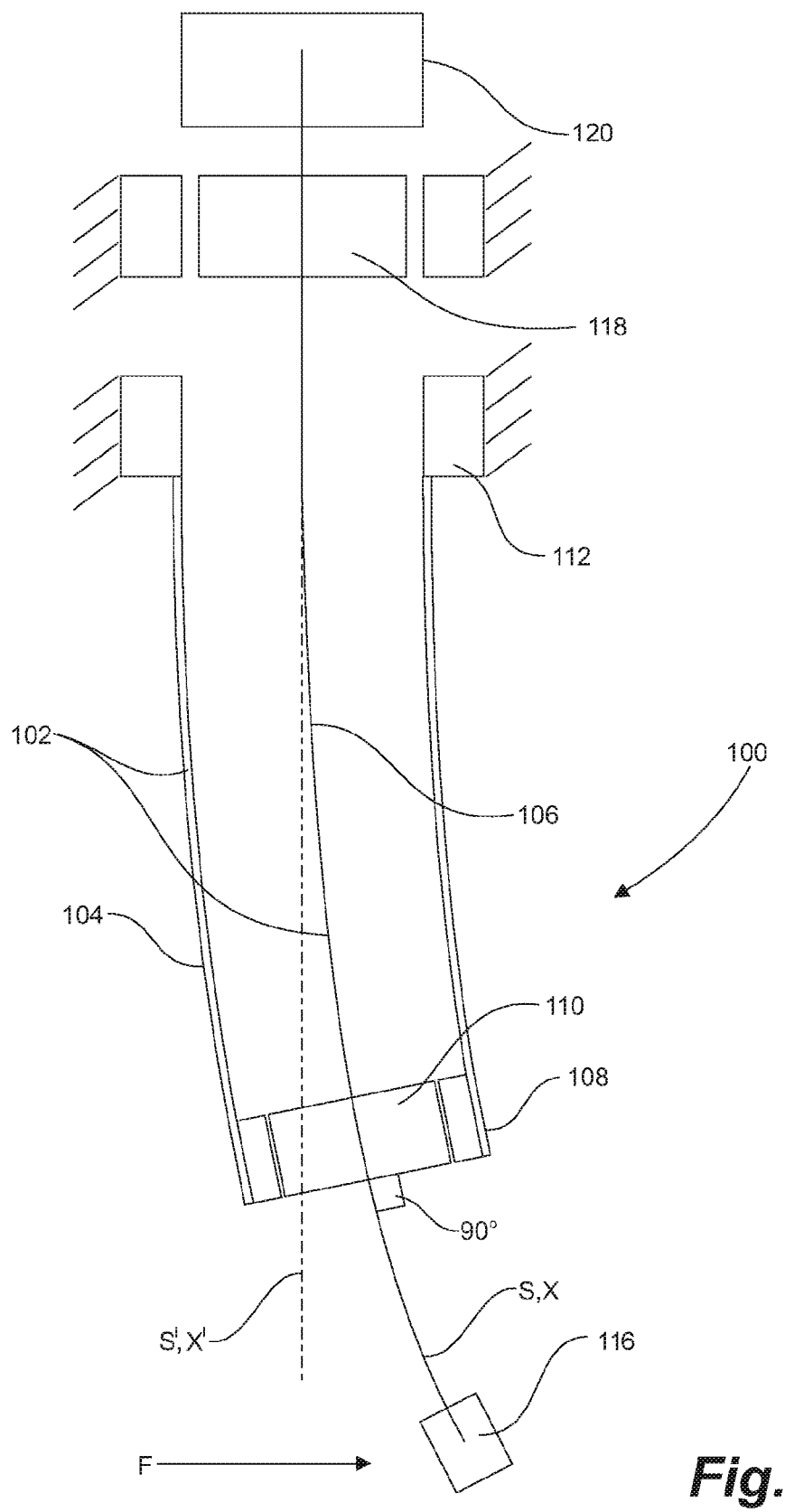
FIG. 2A is a free body diagram illustrating angular deflection of a rotating shaft when disposed in a self-aligning cantilevered shaft assembly described in the embodiments disclosed herein.

With reference to FIG. 2A, a schematic of free body diagram illustrates an embodiment of the self-aligning shaft assembly 102 comprising a stationary and cantilevered housing 104 extending from a base 112 and housing a rotating shaft 106. The shaft 106 is rotatably supported at a distal end 108 of the housing 104 such as by support bearing 110. The shaft is also rotatably supported at an opposing and proximal, non-working end 118, such as adjacent the base 112 or at the driven machine or energy device 120.

A bending stiffness of the housing 104 is matched with a bending stiffness of the shaft 106 so as to enable the axis X of the distal end of the housing 104, supporting bearing 110, to remain aligned with axis S of the shaft 106 under load conditions.

Details of the self-aligning shaft assembly 102 in the hydroelectric turbine system 100 are further detailed in FIGS. 2B to 7.

Figure 2B:
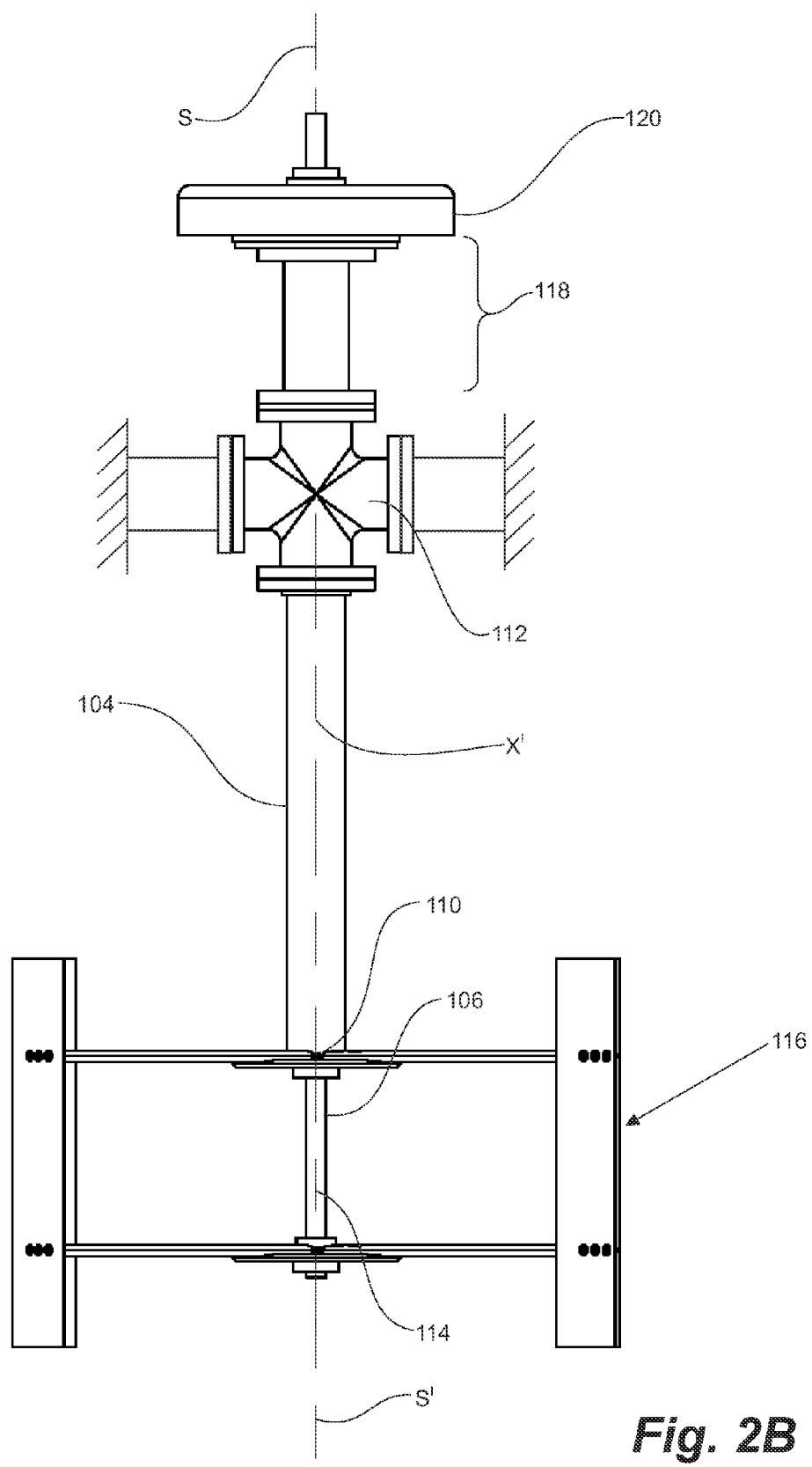
FIG. 2B is a side view of a hydroelectric turbine system comprising the self-aligning cantilevered shaft assembly illustrated schematically in FIG. 2A.

With reference to FIGS. 2A and 2B, the housing 104 is a tubular or elongate non-rotating housing 104 and extends from base 112. In one embodiment, the rotatable shaft 106 originates from about the base 112 and extends co-axially and rotationally through the elongate housing 104. The shaft 106 extends axially out through the distal end 108 of the housing 104 and is cantilevered therefrom, for defining a force-engagement or working portion. The working portion is not straddled by bearings and thus is a working end 114. The shaft 106 is rotatable about an axis of rotation S. The housing 104 has a supporting housing axis X.

A rotatable device, which in embodiments described herein is a turbine 116 is operatively coupled to the shaft's working end 114. Rotation of the turbine 116 rotates the shaft 106. A proximal or non-working end 118 of the shaft 106 is rotatably supported at least at the driven energy device 120, which in embodiments described herein can be an electrical generator. The energy device 120 can be structurally fixed to the base 112.

The shaft 106 is rotatably supported at its working end 114 at the support bearing 110. Generally, the support bearing 110 is disposed between the shaft 106 and the distal end 108 of the elongate housing 104 as close as practical to the shaft's working end 114. In an embodiment, the support bearing 110 is a radial bearing 122, such as that shown in FIG. 5, disposed between the shaft 106 and the elongate housing 104 at about the distal end 108 of the elongate housing 104.

Figure 3:
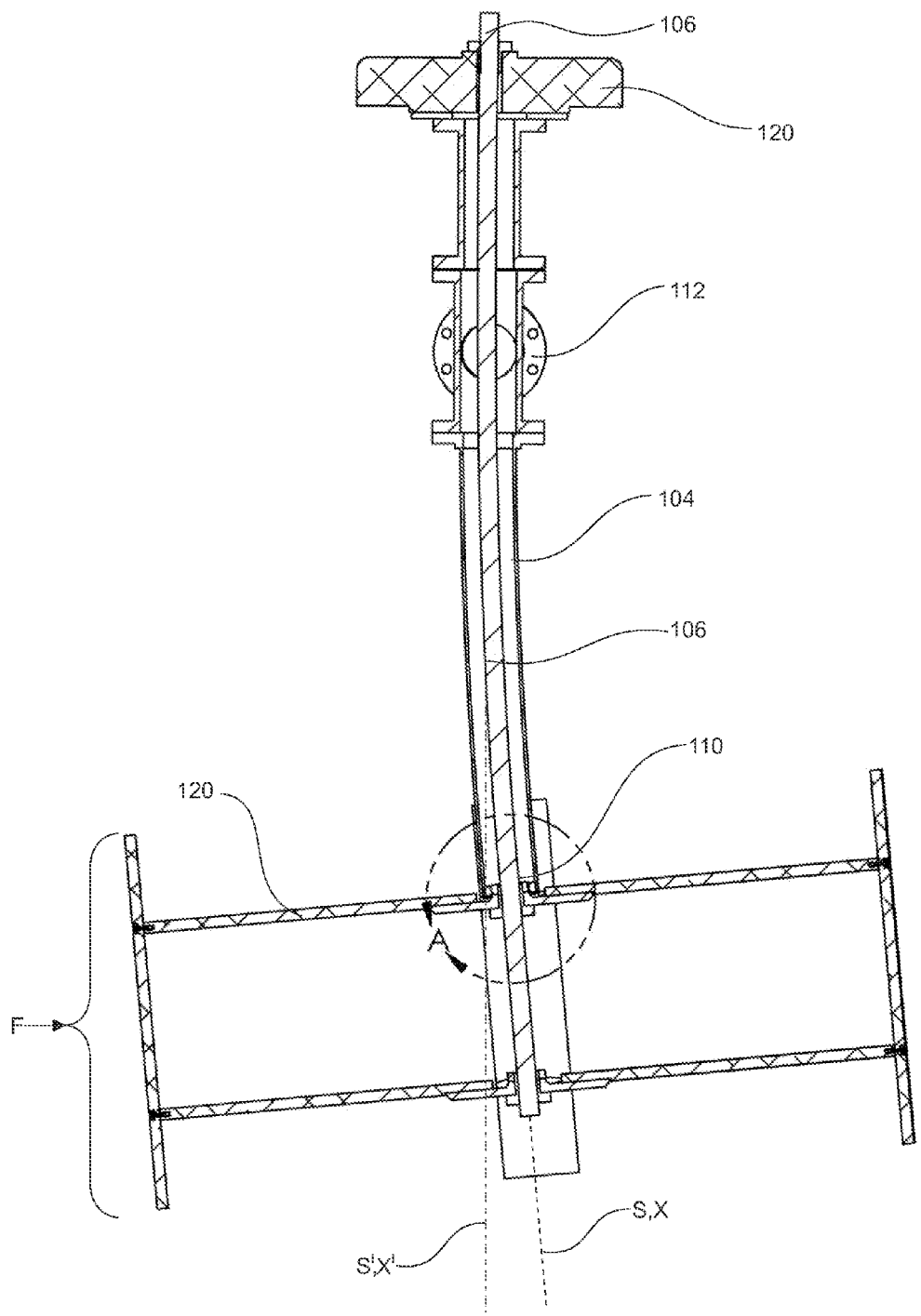
FIG. 3 is a cross-sectional view of the system of FIG. 2A under fluid drag load conditions showing co-deflection of a rotating shaft, an elongate housing and a radial bearing.

As shown in FIGS. 2A and 3, the housing 104 and the shaft 106 deflect together thereby ensuring continuous alignment at support bearing 110, enabling use of a radial bearing that need only tolerate minimum misalignment. At rest, without influence of transverse or lateral loading, the housing axis X' and the shaft axis S' are aligned and linear. Under lateral loading, imposed by force F on the working end 114 of the shaft 106, the shaft 106 deflects and the axis moves from S' to S. The shaft 106 transfers lateral loading through bearing 110 to the distal end 108 of the housing 104. The housing 104 deflects and its axis moves from X' to X. Due to coordinated bending stiffness of the system embodied in housing 104 and shaft 106, axes S, X remain substantially aligned.

As shown in FIG. 2B, in a neutral position, the shaft's axis of rotation S' is aligned with an axis X' of the housing 104. Herein, "neutral position" means a position assumed by the shaft 106 and the housing 104 at rest or when there is no lateral loading. When neither the housing nor the shaft are subjected to a lateral force or load F, the shaft 106, the housing 104 and the radial bearing 110 remain aligned.

In the rotary system depicted in FIGS. 2A to 7, the shaft 106 is representative of a supported beam, constrained at one end, simply supported along a certain length thereof and unsupported as a cantilever structure along its remaining length. In these embodiments, the shaft 106 is constrained at the base 112 and simply supported at the radial bearing 110. The shaft is cantilevered for the balance of its length extending outwardly from the radial bearing 110 to the working portion 18, located along the cantilevered portion. Further, the elongate housing 104 is also representative of a cantilever structure that is supported at the base 112 and constrained against rotation. Therefore, the distal end 108 of the elongate housing 104 is unsupported and is free to move laterally. Under transverse or lateral load conditions, the distal end 108 flexes laterally causing the housing 104 to angularly deflect from its axis X'

The support bearing 110, as described herein, is a radial bearing and is not equipped with any self-aligning structure. Therefore, under load conditions (application of the lateral force F), when the shaft 106 and the housing 104 deflect, the support bearing 110 is not equipped to align itself to the deflected shaft 106. In order for the support bearing 110 to be angularly aligned with the shaft 106, under load conditions, the housing 104 and support bearing 110 supported therein must also be angularly rotated to complement the angular movement of the shaft 106.

With reference to FIGS. 4A, 4B, 5A and 5B, in one embodiment, the support bearing 110 is a radial bearing 122 comprising a stationary non-rotating member or outer race 124 and a rotating portion or inner race 126. The shaft 106 is received within the inner race 126 for co-rotation therewith. The outer race 124 is attached to the distal end 108 of the elongate housing 104. The outer race 124 can be secured to the elongate housing 104 at its distal end 108 using various arrangements. FIGS. 4A and 4B illustrate two such securing arrangements. Having reference again to FIGS. 4A, 4B, 5A and 5B, the outer race 124 can be recessed into a counterbore 128 of the elongate housing 104 and an annular cap or retaining ring 130 is secured to retain the outer race 124 in the counterbore 128. Between the outer and inner races are bearing elements.

Figure 5A:
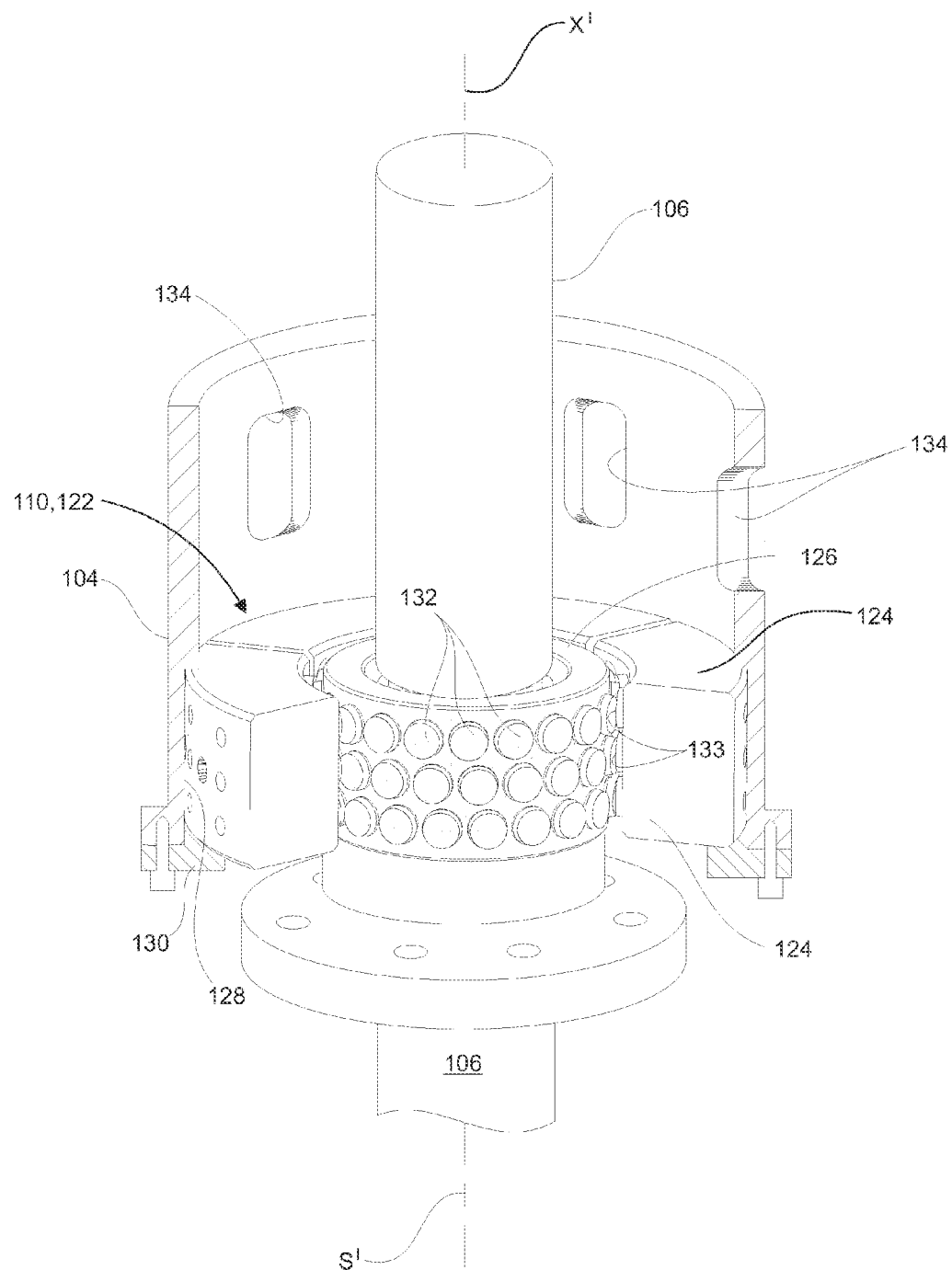
FIG. 5A is a partial perspective view of one embodiment of the radial bearing of FIG. 3, an outer race secured in the elongate housing and an inner race secured to the rotating shaft, one or more outer race segments having been removed for viewing the inner race, each of the inner race and the outer race comprising three axially spaced rows of PDC buttons.

In the embodiments of FIGS. 5A and 5B, the distal or support bearing 110 is a polycrystalline diamond compact (PDC) bearing, the inner race 126 supporting outwardly facing PDC elements 132 and the outer race 124 supporting inwardly facing PDC elements 133. The outward facing and inwardly facing PDC elements 132,133 form the bearing surface.

The outer race 124 is an outer bearing support housed within the distal end 108 of the elongate housing 104 and has an inner bearing surface comprising a plurality of radially, inwardly extending PDC buttons supported therein. The inner race 126 is an inner bearing support, radially and rotationally supported within the bore of the outer bearing support and having an outer bearing surface and a bore formed therethrough, the bore having a shaft axis S', being adapted for receiving the shaft 106 extending therethrough and for co-rotation therewith.

The outer bearing surface comprises a plurality of radially outwardly extending PDC buttons supported therein, wherein the plurality of PDC buttons are arranged in one or more axially spaced, circumferential rows on each of the inner bearing surface and the outer bearing surface. In one embodiment as illustrated in FIG. 5A, where the bearing consists of at least two rows, the plurality of PDC buttons of the at least two rows on either of the inner bearing surface or the outer bearing surface are circumferentially indexed relative to one another so as to ensure there is always an inner PDC button engaging an outer PDC button and the plurality of PDC buttons of the at least two rows on the other of the inner bearing surface or the outer bearing surface are aligned axially for providing continuous radial support and load transition between the inner bearing surface and the outer bearing surface. FIG. 5B illustrates an embodiment where the bearing comprises a single row of PDC buttons on each of the inner bearing surface and outer bearing surface.

With reference to FIGS. 4A, 5A and 5B, in one embodiment, the elongate housing 104 may be provided with one or more ports 134 therethrough an in the vicinity of its distal end 108 for entry of liquid such as water W for lubrication and cooling of the radial bearing 122, suitable for PDC bearings.

As discussed, lateral force F on the shaft 106 also transfers lateral loads to the housing's distal end 108 through the radial bearing 110. The shaft's working end 114 is cantilevered and rotatably supported at the radial bearing and loading thereto results in angular deflection of the shaft at the bearing. Lateral loading to the radial bearing transfers lateral loading to the distal end 108. Cantilevered arrangement of the elongate housing 104 also allows the distal end 108 to move laterally under loading. Lateral movement of the housing's distal end 108 results in angular deflection of the housing 104 from its axis X' at rest. As noted above, the axis S' at rest of the shaft has also undergone angular deflection, now rotating about axis S.

Applicant has identified that by matching a bending stiffness of the elongate housing 104 with that of the shaft 106, the loaded axes X,S of both the elongate housing 104 and the shaft 106 respectively could be caused to deviate from their respective neutral positions by the same deflection angle at bearing 110. As the support bearing 110, in some embodiments radial bearing 122, is attached to the elongate housing 104, deflection of the housing 104 would permit the support bearing 110 to move angularly therewith. Matching of the bending stiffness' enables the radial bearing to follow the angular movement of the shaft 106.

Load induced angular movement of the support bearing 110 is complementary or matches the angular movement of the shaft 106 Thus there is minimal misalignment between the shaft 106 and the support bearing 110. Cooperation between the elongate housing 104 and the shaft 106, both deflecting by the same deflection angle under load conditions, results in the support bearing 110 therebetween remaining longitudinally aligned with the shaft 106 and the housing 104 under load conditions. Consequently, excessive wear and tear and failure of the radial aspects of the support bearing 110, caused by misalignment, is mitigated.

As will be understood by one of skill in the art the bending stiffness, of each of the shaft 106 and elongate housing 104, is related to their respective modulii and moment of inertia. Bending stiffness is related to the magnitude of an angle of deflection. In its simplest form, bending stiffness is a function of the product of the E (Modulus of elasticity) and I (the area moment of inertia). Angle of deflection for a simple cantilever beam is a function of F (Force acting on the tip of the beam) times $L^2$ (Length of the beam squared) divided by the product of the value 2, E (Modulus of elasticity) and I (the area moment of inertia). As described above, the elongate housing 104 is representative of a cantilever beam and, therefore, angular deflection of the elongate housing 104 will be about that of a simple cantilevered beam.

The angular deflection of the shaft 106 is more complex, being a combination of a cantilevered beam beyond the support bearing 110, a simply supported beam at the support bearing 110 and constrained at a support generally located adjacent or beyond the base 112. The shaft 106 need not be necessarily supported at the base 112 and could be supported anywhere about the systems proximal end 118, such as at energy device 120, in order to achieve the supported beam arrangement.

Further complicating the analysis is the effect of the cantilevered housing's reaction to force F transferred thereto by the shaft 106 through the support bearing 110. Such problems, to determine the response of the system to loading at the working end, are not indeterminate and can be estimated adequately using known beam solutions. Tools such as Finite Element Analysis (FEA) are an additional tool to solve for system parameters.

In a power generation embodiment, and for the hydroelectric turbine system 100 to perform the function of power generation from a fluid flow, the working end 114 is immersed in the flowing fluid F. While rotatable, the working end 114 necessarily resists fluid movement and imposes a drag load, and thereby applies a lateral force F on the shaft 106, bending the shaft and causing the shaft to angularly deviate or deflect. The lateral force F is transferred from the shaft 106 to the support bearing 110 and ultimately to the distal end 108 of the elongate housing 104. The housing 104 also flexes or bends, creating an angular deflection of the housing 104 and consequently deflection of the support bearing 110 about the base 112.

Because a bending stiffness of the elongate housing 104 is correlated and matched to that of the shaft 106, lateral force F acting on the shaft 106 and the elongate housing 104 causes both these components to deflect from the neutral position by the same angle. Consequently, the shaft 106 and housing 104 remain aligned through the radial bearing 110, radial bearing 110 remaining in co-axial and parallel relationship with the shaft 106 at all times.

Matching of the bending stiffness of the shaft 106 with the bending stiffness of the cantilever elongate housing 104 enables complementary angular deflection of both the shaft 106 and the elongate housing 104 and consequently that of the support bearing 110 for maintaining the support bearing 110 in alignment with the shaft 106 during operation of the rotary system and more specifically under load conditions.

Figure 6A:
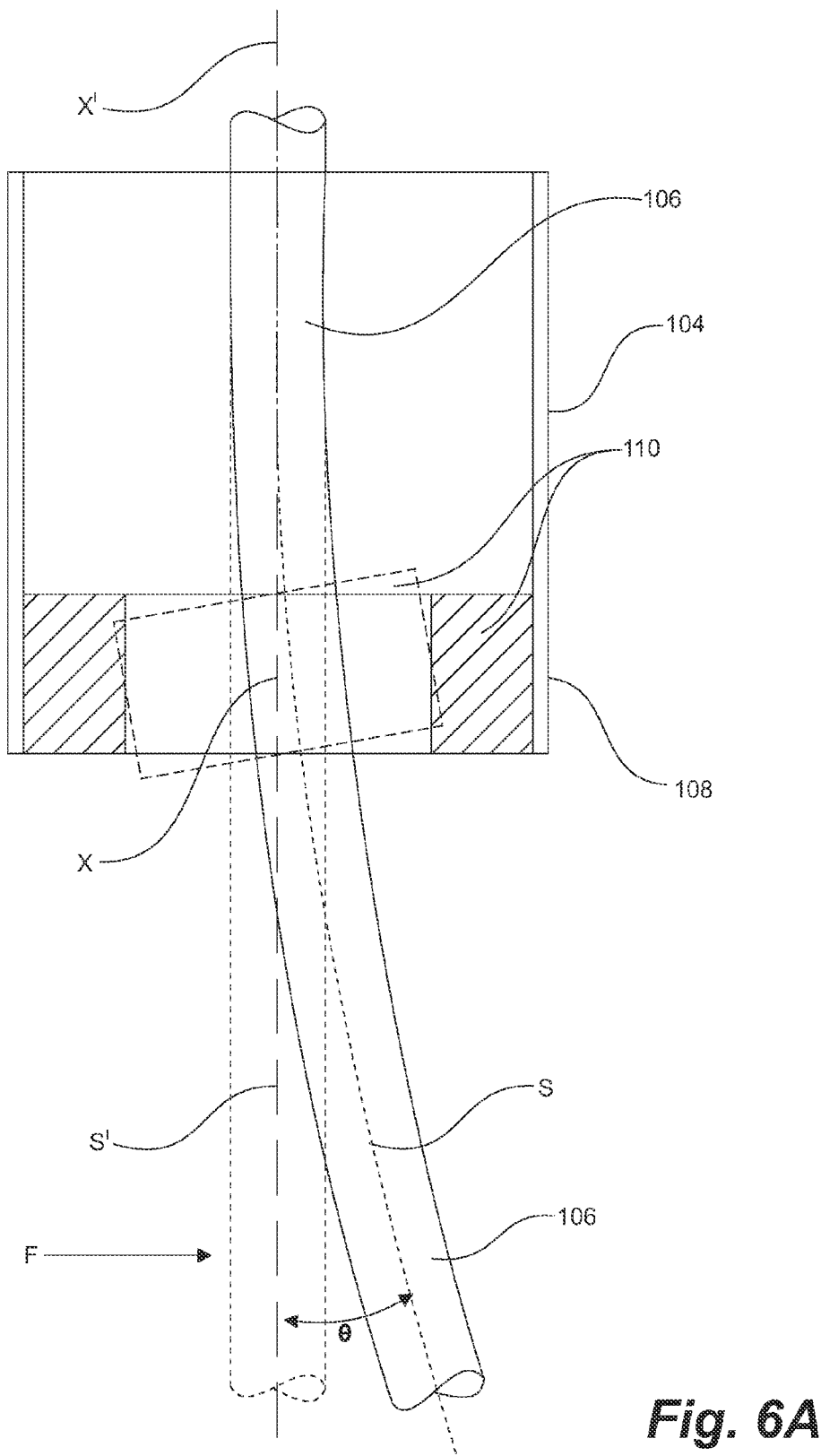
FIGS. 6A and 6B are free body diagrams of the rotating shaft of FIG. 3.
Figure 6B:
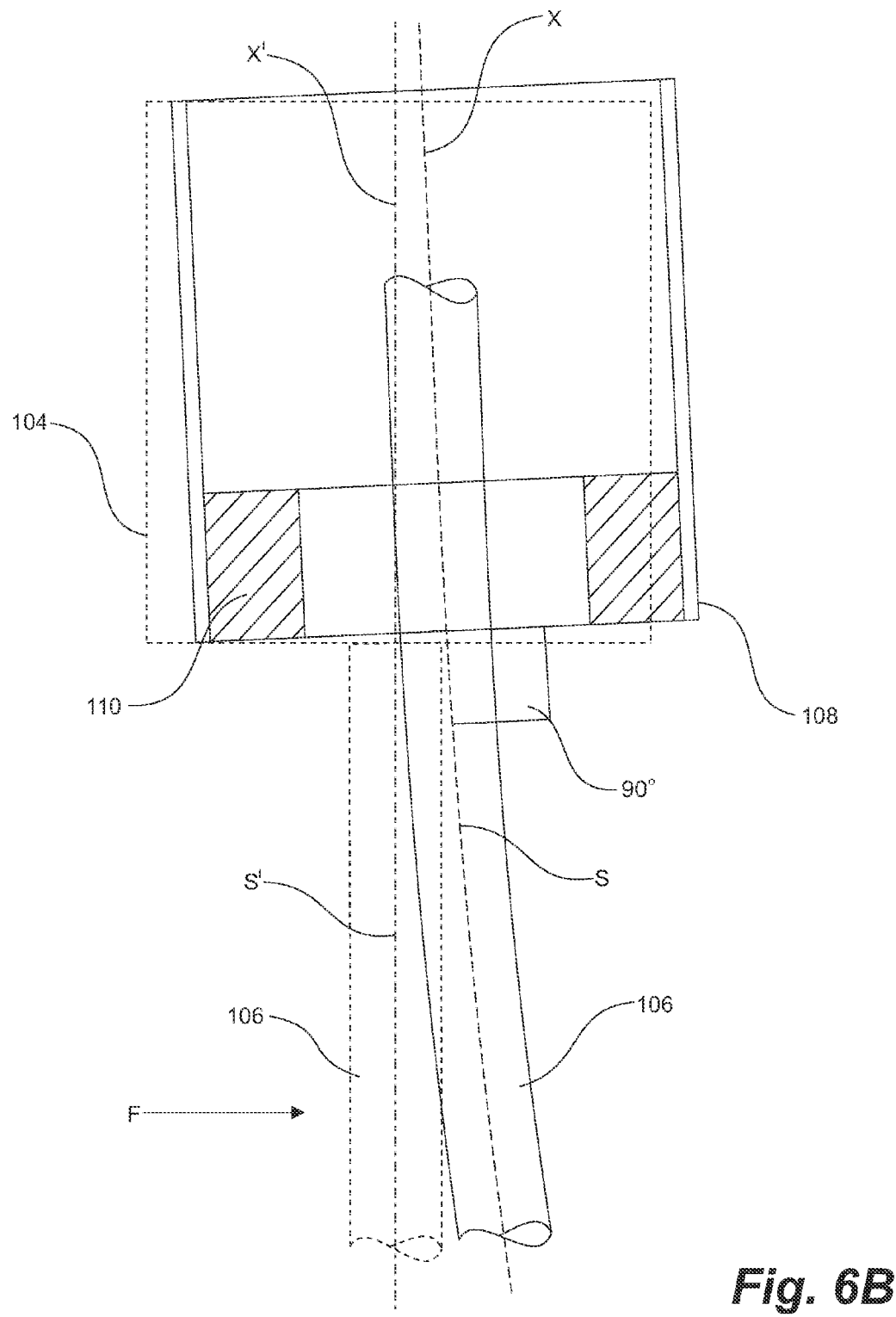

With reference to FIGS. 6A and 6B, the contrasting effects on the support bearing 110 are illustrated in two cases, firstly when the respective bending stiffnesses are not coordinated, and secondly when the bending stiffnesses are coordinated.

In detail and with reference to FIG. 6A, an example is shown where bending stiffness of the elongate housing 104 is not coordinated with that of the shaft 106. The elongate housing 104 and the support bearing 110 are shown in a case where the housing is very stiff, to the point that it remains in a substantially undeflected form. The shaft 106 is shown at rest, in a neutral undeflected position, illustrated in dotted lines (no load condition). As deflected the shaft 106 is shown in solid lines (load condition). In this hypothetical situation as the stiff housing 104 does not deflect, there is only one representation shown.

The shaft 106 of this stiff system is shown under lateral loading and in in a highly deflected form. This results in the shaft's rotational axis S being misaligned from the elongate housing's axis X'. In other words, a non-zero acute angle ($\theta > 0$) is formed between the shaft's rotational axis S and the elongate housing's axis X'. This is an exaggerated example only where the elongate housing 104 is assumed to be infinitely stiff. In order for the support bearing 110 to survive, the bearing 110 would be required to align itself to the shaft 106. A radial bearing is not suitable is such a scenario. The usual conventional solution is to upgrade a radial bearing to a form of bearing that adapts to the angular misalignment. As stated in the background section, such self-aligning bearings are expensive, subject to more frequent maintenance, and in an environment such as immersion in a fluid, are also problematic.

With reference to FIG. 6B, a further example is shown, implementing embodiments described herein, where bending stiffness of the housing 104 is coordinated with that of the shaft 106. An undeflected section of the shaft 106 is shown in dotted lines (no load condition). The deflected section of the shaft 106 is shown in solid lines (load condition). The elongate housing 104, and supported radial bearing 110, are shown in a deflected form. Due to the coordinated angular deflection, the shaft's axis S and the elongate housing's axis X are aligned ($\delta = 0$) and this state enables the radial bearing 110 to function in a pure radial state and need not be upgraded to include self-aligning components. Right at the bearing 110, the shaft axis S would be substantially perpendicular, or at right angles (90) to a square end of the housing 104.

Some of the advantages of the self-aligning shaft support assembly described herein include: a simple structure for countering misalignment problems which enables use of conventional radial bearings; elimination of sophisticated and expensive self-aligning radial bearings; and location of a single bearing disposed above the working end for elimination of a surround structure and for ease of maintenance access or replacement.

Example

Figure 7:
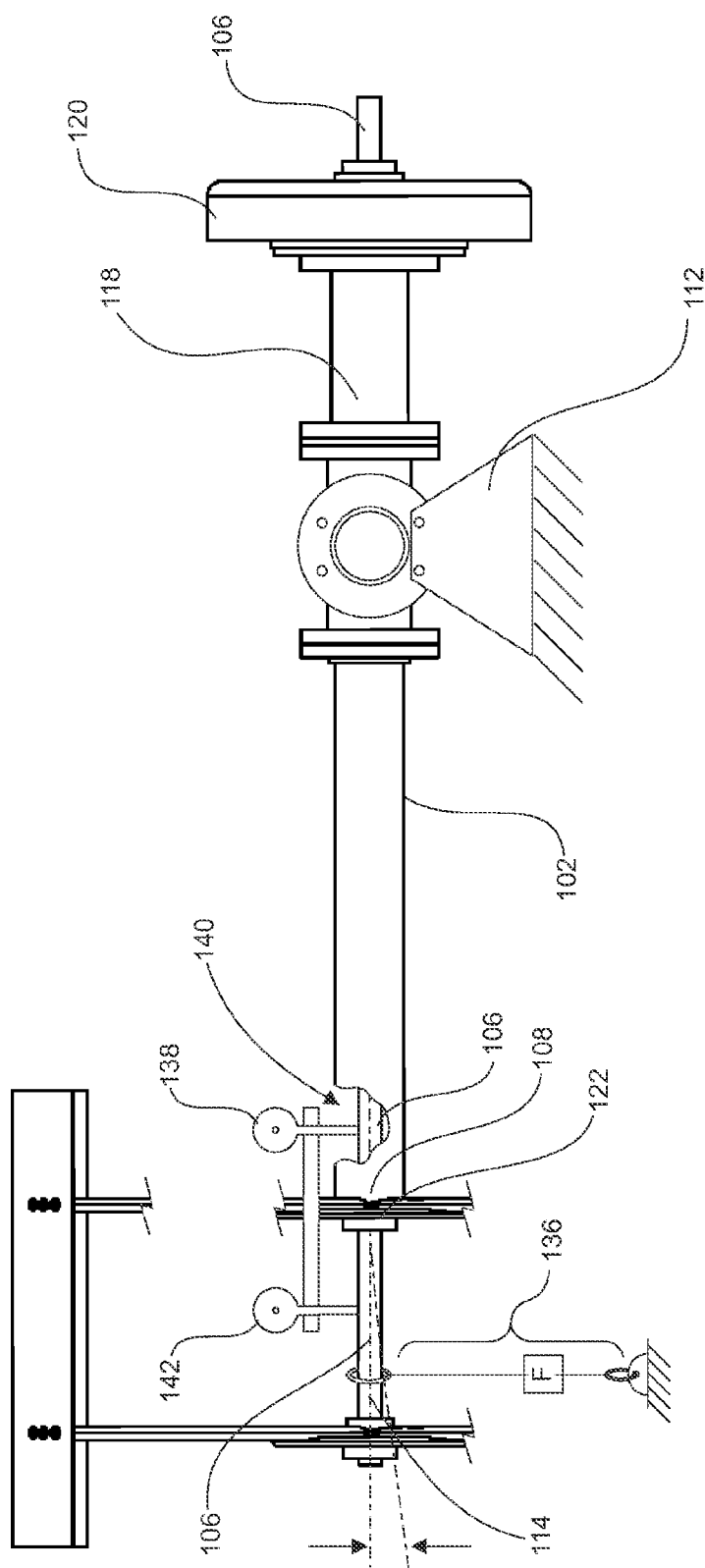
FIG. 7 is a diagrammatic view of a test set-up for analyzing effect of a lateral force on the system of FIG. 3.

With reference to FIG. 7, a test arrangement was provided for an actual hydroelectric turbine embodiment. Lateral deflection of the shaft 106 adjacent to the support bearing 110 (radial bearing 122) was measured relative to the bearing, both inside and outside the elongate housing 104. Angular deflection is not readily determinable directly and thus alignment was determined by reviewing shaft deflection either side of the bearing. With the housing and shaft designed for coordinated stiffness and thus coordinated deflection, the lateral shaft deflection of the shaft immediately either side of the housing's distal end, either side of the bearing, should be similar and within an alignment tolerance for radial bearing use.

In the testing set-up the elongate housing 104 was cantilevered and extended from a stationary support such as base 112. The shaft loading was provided by a tension device 136 for applying a load F to the shaft's working end 114. A first dial indicator 138 was mounted relative to the elongate housing 104 at about the radial bearing 122 and its measuring probe passed through a port 140 in the elongate housing 104 for engaging the shaft 106 therein adjacent the radial bearing 122. A second dial indicator 142 was similarly mounted relative to the elongate housing 104 and its measuring probe engaged the shaft at the shaft's working end 114 extending from the housing's distal end 108. The first and second dial indicators 138 and 142 were each spaced 4" from the radial bearing 122. Both dial indicators 138 and 142 measured the shaft deflection at the radial bearing 122.

The parameters of the system were initially predicted using FEA. The specifics of the rotary system 100 depicted in FIG. 7 were as follows: the elongate housing 104 had an inner diameter of 2.5", an outer diameter of 3" and was 5.15 feet long. The energy device 120 was mounted at 0 feet and was rigidly constrained at 1.45 feet. The radial bearing 122 was supported at 3.70 feet from the rigid constraint acting as base 112. The elongate housing 104 was made from 4140 steel with a Modulus of Elasticity of 29,700 ksi [205 GPa]. The shaft 106 had a diameter of 2" and was 6.67 feet long. The shaft 106 was rotatably supported at 5.33 feet and at the energy device 120. The lateral force F was applied at 6.0 feet. The shaft 106 was made from 1045 Steel also having a Modulus of Elasticity of about 29,700 ksi [205 GPa].

The system was subjected to lateral loads of various magnitudes and the deflections of the shaft 106 relative to the elongate housing 104 for each of these magnitudes were measured.

The readings of the first and second dial indicators at various applied forces were as follows:

| Load (lbs) | Dial Indicator #1 | Dial Indicator #2 | Angular Deflection in degrees over an 8" span |
|---|---|---|---|
| 0 | 0 | 0 | 0 |
| 200 | 0.0015 | 0.0025 | 0.007° |
| 400 | 0.003 | 0.0045 | 0.010° |
| 500 | 0.003 | 0.0055 | 0.017° |
| 600 | 0.004 | 0.0065 | 0.017° |
| 800 | 0.005 | 0.0085 | 0.025° |

-continued

| Load (lbs) | Dial Indicator #1 | Dial Indicator #2 | Angular Deflection in degrees over an 8" span |
|---|---|---|---|
| 1000 | 0.006 | 0.0105 | 0.025° |
| 1200 | 0.007 | 0.0125 | 0.039° |

The difference between the readings is a direct measure of the angular misalignment between the rotational axes of the shaft 106 and the elongate housing 104. If both readings are the same, the radial bearing 110 is deflecting at the same angle as the shaft 106 (for example, the no load case). A designed maximum misalignment was expected to be less than 0.05°.

The angular deflection for an 8" span was calculated as follows: tan inverse (difference between the readings/8). It was observed that there was less than <0.05° of misalignment between the shaft 106 and the elongate housing 104 both within and outside the elongate housing 104.

As a result, the experiment successfully shows that misalignment between the shaft 106 and the radial bearing 110 was insignificant and within the acceptable level of tolerance being less than the designed acceptable misalignment of, 0.05°. This low misalignment results in increased performance and life expectancy of the rotary system.

The embodiments of the invention for which an exclusive property or privilege is claimed are defined as follows:

1. A self-aligning shaft assembly for rotatably supporting a fluid energy extracting device at a working end thereof, comprising:
   an elongate housing cantilevered from and extending from a base to an unsupported distal end, the elongate housing having a nominal longitudinal axis of rotation at rest and a first bending stiffness resistant to a transverse load applied to the distal end;
   a rotating shaft extending generally through the elongate housing and out through the distal end, the shaft being rotatable about the nominal longitudinal axis of rotation; and
   a distal bearing having a rotatable inner race and an outer race disposed between the shaft and the distal end of the elongate housing for rotatably and simply supporting the shaft, the shaft cantilevered from the distal bearing to an unsupported working end, the rotating shaft having a second bending stiffness resistant to a transverse load applied to the shaft's working end;
   wherein the first bending stiffness of the elongate housing and the second bending stiffness of the shaft are such that an angular deflection of the shaft and of the elongate housing from the nominal longitudinal axis of rotation under the transverse load are the same, maintaining alignment between the shaft and the elongate housing, and between the inner and outer races, at the distal bearing.

2. The shaft assembly of claim 1, wherein the shaft is received within the inner race and outer race is affixed at about the distal end of the elongate housing.

3. The shaft assembly of claim 1, wherein the distal bearing is a radial bearing.

4. The shaft assembly of claim 3, wherein the shaft is received within a rotating member of the radial bearing and a non-rotating member of the radial bearing is affixed at about the distal end of the elongate housing.

5. The shaft assembly of claim 1, wherein the transverse loading is applied to the shaft's working end for transfer through the distal bearing to the distal end of the elongate housing, the shaft deflecting angularly and the elongate housing defecting angularly the same amount.

6. The shaft assembly of claim 1, wherein the fluid energy extracting device is a turbine.

7. The shaft assembly of claim 6, further comprising:
a driven machine;
a proximal bearing at or about the driven machine, wherein
the shaft is supported between the proximal and distal bearings.

8. The shaft assembly of claim 1, further comprising:
a driven machine;
a proximal bearing at or about the driven machine, wherein
the shaft is supported between the proximal and distal bearings.

9. The shaft assembly of claim 8, wherein:
the fluid energy extracting device is a turbine; and
the driven machine is a generator.

10. The shaft assembly of claim 9, wherein:
the turbine is a liquid turbine;
the distal end of the elongated housing and distal bearing are submersible in the liquid.

11. The shaft assembly of claim 10, wherein the elongated housing has ports formed for ingress of liquid to the distal bearing.

12. The shaft assembly of claim 8, wherein the distal bearing is a polycrystalline diamond compact (PDC) bearing.

13. A method for minimizing misalignment between a shaft and a cantilevered bearing housing, the method comprising:
extending a housing from a base in a cantilevered arrangement to an unsupported distal end thereof, the housing having a first bending stiffness;
supporting a distal bearing, having a rotatable inner race and an outer race, at the housing's distal end;
extending a shaft through the housing and out through the inner race of the distal bearing for rotatable support thereof, the shaft having a working end and a second bending stiffness; and
applying a transverse load to the shaft's working end for inducing an angular deflection of the shaft according to the second bending stiffness, the first bending stiffness of the housing and the second bending stiffness of the shaft being complementary such that the housing and shaft deflect angularly, wherein alignment of the inner race of the distal bearing and alignment of the outer race of the distal bearing are maintained.

14. The method of claim 13 further comprising operatively coupling a rotatable device at the working end of the shaft.

* * * * *